United States Patent Office.

WILLIAM D. ST. CLAIR, OF CHICAGO, ILLINOIS.

Letters Patent No. 100,081, dated February 22, 1870.

IMPROVED COMPOUND TO BE USED AS AN ARTICLE OF DIET.

The Schedule referred to in these Letters Patent and making part of the same.

I, WILLIAM D. ST. CLAIR, of Chicago, county of Cook, and State of Illinois, have invented a certain Compound to be Used as an Article of Diet, and possessing valuable medical or hygienic properties.

The nature of my invention consists in extracting the peculiar nutritive elements of bran of wheat or other cereals in a liquid form, and in preparing the same in such a way that it may be preserved and used as may be required.

For this purpose I take the bran of any of the cereal grains, and extract therefrom, by any of the well-known methods, the soluble and oily portions, leaving as refuse only the woody fiber and the silicious portions.

The extract thus obtained may be prepared, if desired, with sirup, molasses, or other saccharine substances, in sufficient quantity to render the same palatable, and enough spirits may be added to prevent fermentation and preserve the mixture.

This compound may be taken without any further preparation, and as it contains the valuable properties which are taken from flour and left with the bran by the process of bolting, it forms a convenient and agreeable mode of adding all that is wanting in bread, as commonly made, to render it wholesome and nourishing, or of giving tone to the system without the trouble or annoyance that is often experienced in the effort to utilize bran as an article of food.

What I claim as my invention is—

The fluid extract of bran, substantially as herein described.

WM. D. ST. CLAIR.

Witnesses:
    T. C. CONNOLLY,
    F. LEHMAN.